United States Patent [19]
Wolff

[11] Patent Number: 5,565,123
[45] Date of Patent: Oct. 15, 1996

[54] ELECTRONIC CONTROL CIRCUIT FOR A COOKING UNIT EMPLOYING PULSE WIDTH MODULATION TO CONTROL A RADIANT HEATING ELEMENT

[75] Inventor: David A. Wolff, St. Charles, Ill.

[73] Assignee: Robertshaw Controls Company, Richmond, Va.

[21] Appl. No.: 316,102

[22] Filed: Sep. 30, 1994

[51] Int. Cl.$^6$ .................................................... H05B 1/02
[52] U.S. Cl. ...................... 219/501; 219/497; 219/448; 307/117; 323/908
[58] Field of Search ........................... 219/497,501, 499, 219/505, 481, 448; 307/117; 323/235, 236, 908, 901

[56] References Cited

U.S. PATENT DOCUMENTS 4,607,320  8/1986  Matui et al. ............................ 363/21
4,714,822  12/1987  Braun et al. ............................ 219/449
4,916,599  4/1990  Traxler ....................................... 363/65
5,073,695  12/1991  Gilliland ............................ 219/130.31
5,436,545  7/1995  Bahr et al. ............................... 318/727

*Primary Examiner*—Mark H. Paschall
*Attorney, Agent, or Firm*—Robert J. Black

[57] ABSTRACT

A control circuit for a stove, cooktop or oven utilizing at least one electrical radiant heating element. The circuit effectively compares a controlled voltage and internally generated saw-tooth voltage wave to control the percent power to the radiant element. Also included is a slow start feature to minimize power surge when first energizing the element.

14 Claims, 1 Drawing Sheet

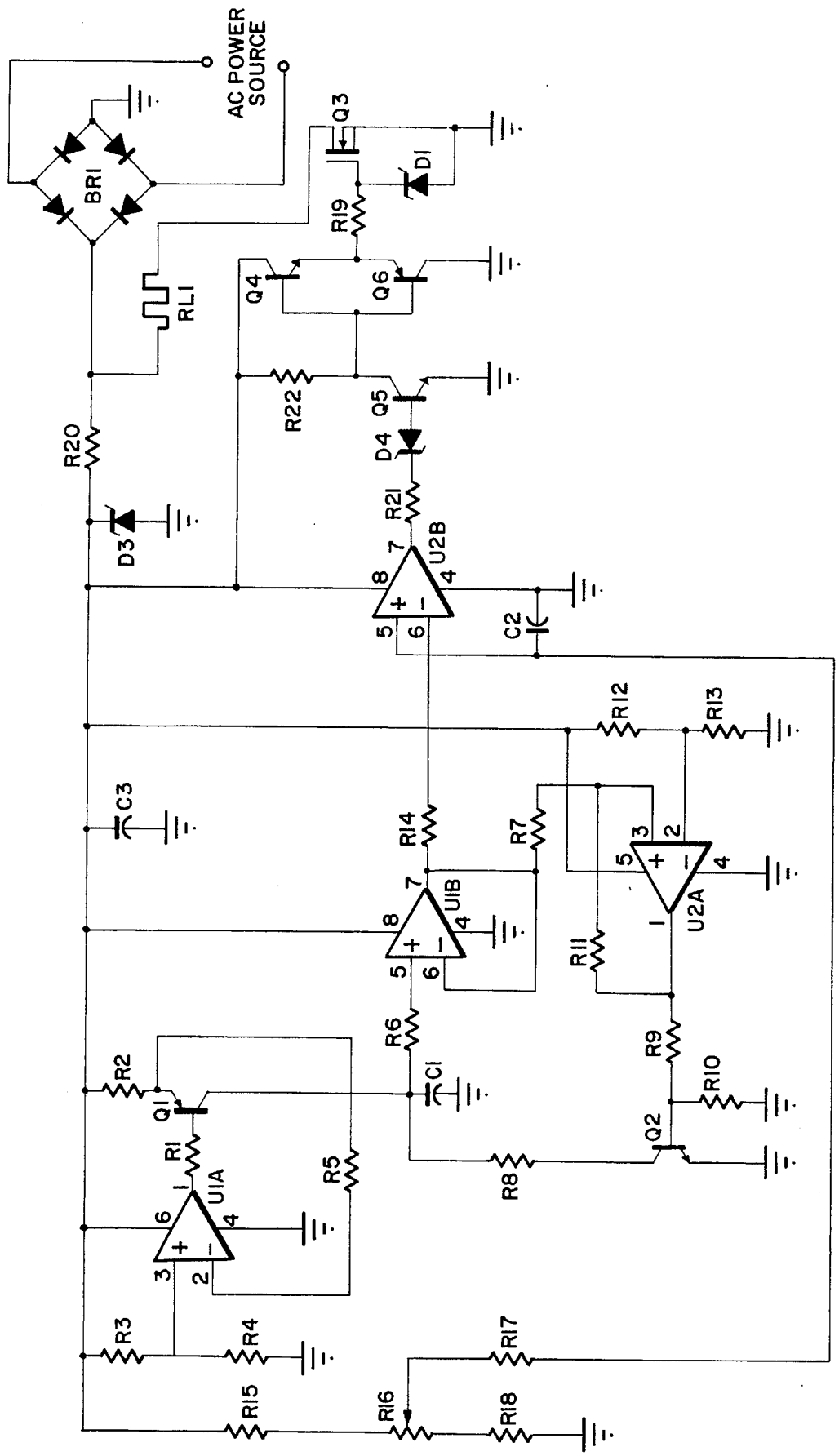

ELECTRONIC CONTROL CIRCUIT FOR A COOKING UNIT EMPLOYING PULSE WIDTH MODULATION TO CONTROL A RADIANT HEATING ELEMENT

BACKGROUND OF THE INVENTION

1. Field of the Invention

The present invention relates to cook stoves employing radiant elements and more particularly to an electronic radiant cooktop control circuit.

2. Background Art

Radiant cooking elements have become relatively commonplace with cooktops being employed as part of free standing units, a part of stove/oven combinations, or built in to a cabinet base.

The most common way to control a radiant cooking element is to use a so-called infinite switch. The switch is an electro-mechanical device utilizing a bi-metallic element to control the on/off cycle of the heating element. The usual arrangement of the elements is cycled fully on for a period of time and then turned off for a second period of time. The duration of the cycles and the on/off times and the method employed will normally depend upon the thermal mass of the food being cooked so as to provide relatively even temperature.

Yet another technique includes controlling the temperature by utilizing a triac device to control the amount of the alternating current line power supplied to the cooking element. This is commonly referred to as "phase firing" and operates in the manner similar to that utilized for light dimmers. In this method, problems frequently are involved because it is very difficult to control the phase angle so that triac fires accurately. It has been discovered that in this situation triacs can also be fired falsely by external noise or hits on the AC line.

A background art search directed to the subject matter of this application and conducted in the U.S. Patent and Trademark Office disclosed the following U.S. Letters Patent:

| | |
|---|---|
| 4,607,320 | 4,859,834 |
| 4,660,057 | 4,933,535 |
| 4,714,822 | 5,151,871 |

Review of the above patents all appear to relate to pulse width modulation control of radiant heat elements failed to disclose techniques like that set forth in the present invention. It was particularly noted that none of the above related to cookers except for U.S. Pat. No. 4,714,822 which was granted to Braun et al for a cooker with means for automatically controlling the heating of a pan with food material. The arrangement taught therein operates as the result of a microprocessor providing the needed control. None of the above patents would appear to claim, teach or disclose a cook top controller employing pulse width modulation utilizing circuitry as taught by the present invention.

SUMMARY OF THE INVENTION

Control for a radiant element of a cooktop in accordance with the present invention consists essentially of a linear saw-tooth output oscillator, a voltage comparator, a power output drive stage, and a full wave diode bridge. The saw-tooth oscillator and voltage comparator form a pulse width modulator. The input modulation signal in the present application is a DC voltage representative of the percentage of the power to be delivered from the heating element. This in turn determines the on state duty cycle of the output wave form.

In the present arrangement, a constant current source is utilized to charge a capacitor and develop a linear ramp voltage. This ramp voltage is then buffered by a source follower and applied to the positive input of a level comparator. The level comparator's negative input is biased to a reference voltage level. In this case, one half of the supply voltage. When the ramp voltage at the positive pin of the comparator reaches a reference voltage, the comparator turns on and drives the base of a transistor which is connected to a discharge capacitor. Subsequently, when the capacitor is discharged, the comparator turns off the drive and the cycle repeats. The frequency of operation of the present invention, in at least one embodiment is approximately 1.5 kilohertz.

The saw-tooth wave form is then fed to the negative input of another comparator. The positive input goes to the DC source that controls the power setting of the element. At the start of each cycle, the saw-tooth is typically below this power setting and the output of the comparator is high. When the saw-tooth reaches and goes above the power setting, then the output of the comparator will go low. This forms a rectangular wave form that is variable in duty cycle.

This rectangular wave form, or pulse train, is buffered by a push/pull emitter follower and is applied to the output power switch transistor. In the present embodiment this was an IGBT device. Output could alternatively be a MOSFET or even a bi-polar transistor with obvious modifications to the output drive circuitry. Therefore, the current in the heating element is pulsed on and off rapidly with a variable duty cycle. If it is on longer than off, the element will be very hot. If it is more off than on, then the element will be cooler. The supply to the element must be DC. This is accomplished by using a full wave diode bridge to rectify the AC line.

Of particular advantage of the present system is that the oscillator does not have to be synchronized to anything. It has been determined that however for optimum operation the frequency of operation of the oscillator should be at least ten times faster than the power line frequency. Another advantage of the present system, is that by adding a time constant to the input DC control voltage, the element can be "slow started", which will reduce the turn-on current surge common with resistive heating elements.

BRIEF DESCRIPTION OF THE DRAWING

A better understanding of the present invention may be had from consideration of the following detailed description taken in conjunction with the accompanying drawing, which is a schematic circuit diagram of a radiant cooktop controller in accordance with the present invention.

DETAILED DESCRIPTION OF THE PREFERRED EMBODIMENTS

Referring now to the accompanying drawing, a controller circuit for a radiant heating element of a cooktop is shown in schematic form.

Microchip operational amplifier U1A in combination with transistor Q1 and resistor R1 form a constant current source. Voltage across resistor R2 determines the source current as set by Ohm's law in combination with the ratio of resistor R3 to resistor R4. This bias voltage is held constant by feedback provided by resistor R5 to the negative input of microchip circuit U1A. The constant current output from the above outlined circuitry is applied from the selector of transistor Q1 to capacitor C1 to form a linear voltage ramp.

Microchip operational amplifier U1B acts as a voltage follower to buffer the voltage across the capacitor C1. The output of the voltage follower stage is fed through resistor R14 to the negative input to operational amplifier U2B and also through resistor R7 to the positive input of operational amplifier U2A.

Operational amplifier U2A is the comparator that determines the maximum voltage that capacitor C1 can charge to. Resistors R12 and R13 are a voltage divider for the bias that set the maximum charge voltage. Resistors R7 and R11 establish the hysteresis that determines the peak to peak voltage across capacitor C1. The output of comparator operational amplifier U2A drives the base of transistor Q2 through resistor R9 and resistor R10. Transistor Q2 operates to discharge capacitor C1. Resistor R8 limits the current in the collector of transistor Q2 and slows the discharge time of capacitor C1. Operational amplifier U2B functions as the actual duty cycle modulator. This stage compares the saw-tooth wave form from the previous stage with a DC control voltage that represents the percent on time for the element. The saw-tooth output wave form is coupled though the negative input through resistor R14 while the controlled voltage is coupled through the control voltage derived from adjustable resistor R16 in series with resistors R15 and R18 and coupled through resistor R17 to the positive input. Capacitor C2 limits the rise time of the control voltage and effectively acts as a turn on surge limiter when the heating element is cold. When the saw-tooth voltage is lower than the VC control signal, the output will be high, and when higher than the control signal, it will be low. This signal is level shifted from noise immunity through resistor R21 and diode D4 to the base of transistor Q5.

Q5 is an inverter used to speed up the rise and fall time of the output derived wave form. In the present embodiment, an IGBT Q3 is used as the output device. This type of output device as well as power MOSFETS, require that the gate be driven with a push/pull emitter follower consisting of transistors Q4 and Q8. The output IGBT Q3 acts as a chopper, chopping the DC that is across the load element RL1. Rectifier BR1 is a bridge which operates to full wave rectify the AC line voltage that is applied to the load. Resistor R20, capacitor C3 and diode D3 comprise the low voltage supply utilized for the control electronics. From the foregoing it will be seen that the heating element RL1 operates on a controlled basis, in response to pulses generated by the described circuitry.

While but a single embodiment of the present invention has been shown, it will be obvious to those skilled in the art that numerous modifications may be made without departing from the spirit of the present invention, which shall be limited only by the scope of the claims appended hereto.

What is claimed is:

1. A control circuit for a cooking unit including at least one radiant heating element, said circuit comprising:

a power supply connected to a source of AC power, including a rectifier connected to both said radiant heating element and to a voltage reduction means;

a constant current source connected to said voltage reduction means, including an output to a capacitor, operated to charge said capacitor to generate a linear voltage ramp;

a voltage follower connected to said capacitor operated to buffer the voltage across said capacitor;

said voltage follower including output circuit connections to a comparator and to a modulator;

said comparator operated in response to an output from said follower to determine the maximum charge charge voltage to which said capacitor can be charged;

said modulator including an input circuit connection from a controlled voltage source, operated to compare the voltage from said controlled voltage source with the output from said voltage follower to generate an output control signal;

a chopper circuit including input circuit connections from said modulator and an output circuit connection to said radiant heating element;

said chopper circuit operated in response to said modulator output control signal to control the flow of power between said rectifier and said heating element.

2. A control circuit for a cooking unit as claimed in claim 1 wherein:

said modulator is operated in response to the voltage from said controlled voltage source being higher than the output from said voltage follower to generate a high output control signal.

3. A control circuit for a cooking unit as claimed in claim 1 wherein:

said modulator is operated in response to the voltage from said controlled voltage source being less than the output from said voltage follower to generate a low output signal.

4. A control circuit for a cooking unit as claimed in claim 2 wherein:

said chopper circuit is operated in response to said modulator to connect power between said rectifier and said heating element.

5. A control circuit for a cooking unit as claimed in claim 3 wherein:

said chopper circuit is operated in response to said modulator to interrupt power from said rectifier to said heating element.

6. A control circuit for a cooking unit as claimed in claim 1 wherein:

said constant current source comprises an operational amplifier driving a transistor biased to function as a constant current source.

7. A control circuit for a cooking unit as claimed in claim 1 wherein:

said voltage follower comprises an operational amplifier including an input circuit connection from said capacitor.

8. A control circuit for a cooking unit as claimed in claim 1 wherein:

said comparator includes an operational amplifier including an output driving a transistor whose collector is connected to said capacitor.

9. A control circuit for a cooking unit as claimed in claim 1 wherein:

said modulator in response to input connections from said controlled voltage source and from said buffer is operated to control the duty cycle of said heating element.

10. A control circuit for a cooking unit as claimed in claim 1 wherein:

said chopper circuit input circuit connections from said modulator include an inverter, operated to speed up the rise end fall time of an output drive wave form.

11. A control circuit for a cooking unit as claimed in claim 10 wherein:

said chopper circuit input circuit connection further includes connected between said inverter and said chopper circuit a push/pull transistorized emitter follower circuit.

12. A control circuit for a cooking unit as claimed in claim 1 wherein:

said chopper circuit includes an IGBT as the output control device.

13. A control circuit for a cooking unit as claimed in claim 1 wherein:

said chopper circuit includes a power MOSFET as the output control device.

14. A control circuit for a cooking unit as claimed in claim 1 wherein:

said controlled voltage source is manually adjustable.

\* \* \* \* \*